(12) United States Patent
Huizenga

(10) Patent No.: US 7,884,732 B2
(45) Date of Patent: Feb. 8, 2011

(54) WIRELESS NETWORK CONTROL FOR BUILDING FACILITIES

(75) Inventor: Charles A. Huizenga, Berkeley, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 12/579,353

(22) Filed: Oct. 14, 2009

(65) Prior Publication Data

US 2010/0191388 A1    Jul. 29, 2010

Related U.S. Application Data

(63) Continuation of application No. 11/376,620, filed on Mar. 14, 2006, now Pat. No. 7,623,042.

(60) Provisional application No. 60/661,714, filed on Mar. 14, 2005.

(51) Int. Cl.
G08B 21/00    (2006.01)
G05F 1/00    (2006.01)

(52) U.S. Cl. .................... 340/635; 340/539.1; 315/291

(58) Field of Classification Search .............. 340/539.1, 340/539.11, 539.26, 641, 642, 643, 656, 340/506, 815.6, 815.67, 635; 315/291, 294, 315/224; 362/263; 700/295; 713/340
See application file for complete search history.

(56) References Cited

U.S. PATENT DOCUMENTS

| | | | |
|---|---|---|---|
| 4,242,614 A | 12/1980 | Vatis et al. |
| 4,323,820 A | 4/1982 | Teich |
| 4,355,309 A | 10/1982 | Hughey et al. |
| 4,358,717 A | 11/1982 | Elliott |
| 4,454,509 A | 6/1984 | Buennagel et al. |
| 4,686,380 A | 8/1987 | Angott |
| 4,797,599 A | 1/1989 | Ference et al. |
| 5,005,211 A | 4/1991 | Yuhasz |
| 5,146,153 A | 9/1992 | Luchaco et al. |
| 5,237,264 A | 8/1993 | Moeley et al. |
| 5,248,919 A | 9/1993 | Hanna et al. |
| 5,357,170 A | 10/1994 | Luchaco et al. |
| 5,373,453 A | 12/1994 | Bae |
| 5,471,063 A | 11/1995 | Hayes et al. |
| 5,561,351 A | 10/1996 | Vrionis et al. |
| 5,572,438 A | 11/1996 | Ehlers et al. |

(Continued)

OTHER PUBLICATIONS

U.S. Appl. No. 12/912,717 by Charles Huizenga, filed on Oct. 26, 2010.*

(Continued)

*Primary Examiner*—Van T. Trieu
(74) *Attorney, Agent, or Firm*—Carr & Ferrell LLP

(57) ABSTRACT

Wireless control of building facility systems via a wireless network using a wireless relay controller with a unique identifier. The wireless relay controller receives wireless control signals via a wireless communication network. The wireless relay controller determines that a wireless control signal concerns the wireless relay controller based on the unique identifier. The wireless relay controller further identifies a mode of operation for a specified relay indicated by the wireless control signal and controls the power to the specified relay in accordance with the wireless control signal. The wireless control signal may also monitor the power consumption of the load controlled by the specified relay and send that information to the network.

19 Claims, 7 Drawing Sheets

U.S. PATENT DOCUMENTS

| | | | |
|---|---|---|---|
| 5,637,930 A | 6/1997 | Rowen et al. | |
| 5,770,926 A | 6/1998 | Choi et al. | |
| 5,872,429 A | 2/1999 | Xia et al. | |
| 5,905,442 A | 5/1999 | Mosebrook et al. | |
| 5,909,087 A | 6/1999 | Bryde et al. | |
| 5,962,989 A | 10/1999 | Baker | |
| 5,982,103 A | 11/1999 | Mosebrook et al. | |
| 6,025,783 A | 2/2000 | Steffens, Jr. | |
| 6,044,062 A | 3/2000 | Brownrigg et al. | |
| 6,100,653 A | 8/2000 | Lovell et al. | |
| 6,148,306 A | 11/2000 | Seidl et al. | |
| 6,169,377 B1 | 1/2001 | Bryde et al. | |
| 6,184,622 B1 | 2/2001 | Lovell et al. | |
| 6,249,516 B1 | 6/2001 | Brownrigg et al. | |
| 6,252,358 B1 | 6/2001 | Xydis et al. | |
| 6,297,724 B1 | 10/2001 | Bryans et al. | |
| 6,300,727 B1 | 10/2001 | Bryde et al. | |
| 6,301,674 B1 | 10/2001 | Saito et al. | |
| 6,311,105 B1 | 10/2001 | Budike | |
| 6,388,399 B1 | 5/2002 | Eckel et al. | |
| 6,400,280 B1 | 6/2002 | Osakabe | |
| 6,504,266 B1 | 1/2003 | Ervin | |
| 6,535,859 B1 | 3/2003 | Yablonowski | |
| 6,633,823 B2 | 10/2003 | Bartone et al. | |
| 6,640,142 B1 | 10/2003 | Wong et al. | |
| 6,689,050 B1 | 2/2004 | Beutter et al. | |
| 6,700,334 B2 * | 3/2004 | Weng | 315/294 |
| 6,803,728 B2 | 10/2004 | Balasubramaniam et al. | |
| 6,891,838 B1 | 5/2005 | Petite et al. | |
| 6,904,385 B1 | 6/2005 | Budike, Jr. | |
| 6,914,395 B2 | 7/2005 | Yamauchi et al. | |
| 6,914,893 B2 | 7/2005 | Petite et al. | |
| 6,927,546 B2 | 8/2005 | Adamson et al. | |
| 6,990,394 B2 | 1/2006 | Pasternak | |
| 7,006,768 B1 | 2/2006 | Franklin | |
| 7,039,532 B2 | 5/2006 | Hunter | |
| 7,042,170 B2 | 5/2006 | Vakil et al. | |
| 7,045,968 B1 | 5/2006 | Bierman et al. | |
| 7,054,271 B2 | 5/2006 | Brownrigg et al. | |
| 7,079,808 B2 | 7/2006 | Striemer | |
| 7,103,511 B2 | 9/2006 | Petite | |
| 7,167,777 B2 | 1/2007 | Budike, Jr. | |
| 7,199,530 B2 | 4/2007 | Vakil et al. | |
| 7,233,080 B2 | 6/2007 | Garnault et al. | |
| 7,263,073 B2 | 8/2007 | Petite et al. | |
| 7,274,975 B2 | 9/2007 | Miller | |
| 7,307,389 B2 | 12/2007 | Vakil et al. | |
| 7,307,542 B1 | 12/2007 | Chandler et al. | |
| 7,333,880 B2 | 2/2008 | Brewster et al. | |
| 7,346,433 B2 | 3/2008 | Budike | |
| 7,349,766 B2 | 3/2008 | Rodgers | |
| 7,352,972 B2 | 4/2008 | Franklin | |
| 7,354,175 B2 * | 4/2008 | Culbert et al. | 362/263 |
| 7,369,060 B2 | 5/2008 | Veskovic et al. | |
| 7,400,226 B2 | 7/2008 | Barrieau et al. | |
| 7,490,957 B2 | 2/2009 | Leong et al. | |
| 7,491,111 B2 | 2/2009 | Ghaly | |
| 7,528,503 B2 | 5/2009 | Rognli et al. | |
| 7,561,977 B2 | 7/2009 | Horst et al. | |
| 7,565,227 B2 | 7/2009 | Richard et al. | |
| 7,571,063 B2 | 8/2009 | Howell et al. | |
| 7,599,764 B2 | 10/2009 | Matsuura et al. | |
| 7,606,639 B2 | 10/2009 | Miyaji | |
| 7,623,042 B2 | 11/2009 | Huizenga | |
| 7,650,425 B2 | 1/2010 | Davis et al. | |
| 7,706,928 B1 | 4/2010 | Howell et al. | |
| 2001/0025349 A1 | 9/2001 | Sharood et al. | |
| 2002/0043938 A1 | 4/2002 | Lys | |
| 2003/0020595 A1 | 1/2003 | Wacyk | |
| 2003/0209999 A1 * | 11/2003 | Hui et al. | 315/294 |
| 2004/0002792 A1 | 1/2004 | Hoffknecht | |
| 2004/0051467 A1 | 3/2004 | Balasubramaniam et al. | |
| 2004/0100394 A1 | 5/2004 | Hitt | |
| 2005/0043862 A1 | 2/2005 | Brickfield et al. | |
| 2005/0090915 A1 | 4/2005 | Geiwitz | |
| 2005/0234600 A1 | 10/2005 | Boucher et al. | |
| 2006/0044152 A1 | 3/2006 | Wang | |
| 2006/0142900 A1 | 6/2006 | Rothman et al. | |
| 2006/0215345 A1 | 9/2006 | Huizenga | |
| 2006/0244624 A1 * | 11/2006 | Wang et al. | 340/815.67 |
| 2007/0005195 A1 | 1/2007 | Pasquale et al. | |
| 2007/0085700 A1 | 4/2007 | Walters et al. | |
| 2007/0090960 A1 | 4/2007 | Miki | |
| 2007/0271006 A1 | 11/2007 | Golden et al. | |
| 2007/0273307 A1 | 11/2007 | Westrick et al. | |
| 2007/0276547 A1 | 11/2007 | Miller | |
| 2008/0071391 A1 | 3/2008 | Busby et al. | |
| 2008/0133065 A1 | 6/2008 | Cannon et al. | |
| 2008/0167756 A1 | 7/2008 | Golden et al. | |
| 2008/0242314 A1 | 10/2008 | McFarland | |
| 2008/0258633 A1 | 10/2008 | Voysey | |
| 2008/0281473 A1 | 11/2008 | Pitt | |
| 2009/0026966 A1 | 1/2009 | Budde et al. | |
| 2009/0055032 A1 | 2/2009 | Rodgers | |
| 2009/0063257 A1 | 3/2009 | Zak et al. | |
| 2009/0066473 A1 | 3/2009 | Simons | |
| 2009/0072945 A1 | 3/2009 | Pan et al. | |
| 2009/0132070 A1 | 5/2009 | Ebrom et al. | |
| 2009/0198384 A1 | 8/2009 | Ahn | |
| 2009/0240381 A1 | 9/2009 | Lane | |
| 2009/0243517 A1 | 10/2009 | Verfuerth et al. | |
| 2009/0248217 A1 | 10/2009 | Verfuerth et al. | |
| 2009/0262189 A1 | 10/2009 | Marman | |
| 2009/0267540 A1 | 10/2009 | Chemel et al. | |
| 2009/0292402 A1 | 11/2009 | Cruickshank | |
| 2009/0292403 A1 | 11/2009 | Howell et al. | |
| 2009/0299527 A1 | 12/2009 | Huizenga | |
| 2010/0114340 A1 | 5/2010 | Huizenga et al. | |
| 2010/0134051 A1 | 6/2010 | Huizenga et al. | |
| 2010/0185339 A1 | 7/2010 | Huizenga et al. | |

OTHER PUBLICATIONS

U.S. Appl. No. 12/940,902 by Charles Huizenga, filed on Nov. 5, 2010.*

U.S. Appl. No. 12/913,725 by Charles Huizenga, filed on Oct. 27, 2010.*

Adams, J.T., "Wireless Sensors and Controls Make the Organic Building," May 2006, Proceedings of the 2006 IEEE Intl. Symposium on Electronics and the Environment, pp. 109-113.

Canovas, S. R., Chermont, M.G., and Cugnasaca, C.E., "Remote Monitoring and Actuation Based on LonWorks Technology," Jul. 2005, 2005 EFITA/WCCA Joint Congress on IT in Agriculture.

Gislason, D. and Gillman, T. "ZigBee Wireless Sensor Networks," Nov. 2004, Dr. Dobbs online journal, www.ddj.com/184405887.

Gutierrez, J.A., "On the Use of IEEE Std. 802, 15.4 to enable Wireless Sensor Networks in Building Automation," Dec. 2007, Int'l. Journal of Wireless Information Network, vol. 14, No. 4.

Kintner-Meyer, M. "Opportunities of Wireless Sensors and Controls for Building Operations," Aug.-Sep. 2005, Energy Engineering, vol. 102, No. 5, pp. 27-48.

Montegi, N., Piette, M., Kinney, S., and Herter, K., "Web-Based Energy Information Systems for Energy Management and Demand Response in Commercial Buildings," Apr. 2003, Lawrence Berkeley National Laboratory.

Park, H., Burke, J., and Srivastava, M., "Design and Implementation of a Wireless Sensor Network for Intelligent Light Control," Apr. 2007, IPSN 07.

Sandhu, J.S.S., Agogino, A.M., "Wireless Sensor Networks for Commercial Lighting Control: Decision Making with Multi-Agent Systems," Jul. 2004, Workshop on Sensor Networks.

Sandhu, J.S., Agogino, A.M., and Agogino, A.K., "Wireless Sensor Networks for Commercial Lighting Control: Decision Making with Multi-Agent Systems," 2004, American Association for Artificial Intelligence.

Sekinger, J., "Wireless Lighting Control Technology," Oct. 2005, Phillips NAESCO Midwest Regional Mtgs.

Singhvi, V., Krause, A., Guestrin, C., Garrett, J.H., Matthews, H.S. "Intelligent Light Control Usine Sensor Networks," Nov. 2005, SenSys 2005.

Teasdale, D., Rubinstein, F., Watson, D., and Purdy, S., "Annual Technical Progress Report: Adapting Wireless Technology to Lighting Control and Environmental Sensing," Oct. 2005, Dust Networks, Annual Technical Progress Report.

Wang, D., Arens, E., and Federspiel, C., "Opportunities to same energy and improve comfort by using wireless sensor networks in buildings," Oct. 2003, Proceedings of the third Intl Conference for Enhanced Building Operations.

* cited by examiner

WIRELESS NETWORK CONTROL FOR BUILDING FACILITIES

CROSS-REFERENCES TO RELATED APPLICATIONS

This application is a continuation and claims the priority benefit of U.S. patent application Ser. No. 11/376,620 filed Mar. 14, 2006 now U.S. Pat. No. 7,623,042, which claims priority to U.S. provisional patent application No. 60/661,714 filed Mar. 14, 2005, the disclosures of which are hereby incorporated by reference herein in its entirety for all purposes.

BACKGROUND OF THE INVENTION

1. Field of the Invention

The present invention relates in general to electrical energy control. In particular, the present invention relates to a wireless lighting controller for building facilities.

2. Description of Related Art

Lighting energy accounts for nearly 40% of commercial building electricity consumption. In many buildings, much of this energy use is a result of lighting that is on unnecessarily because of inadequate controls. Traditional wired switches are expensive to install, inflexible to changing requirements in the workplace, and unable to respond to available daylight or occupancy. For example, many buildings have adequate daylight along the perimeter, but the installed switching is not adequate to turn off the unnecessary lights.

There are wireless lighting controls on the market, but each suffer from certain shortcomings. Available residential systems tie a specific switch to a specific relay or relay channel and do not provide the flexibility needed for commercial building applications. Commercial systems require that specialized ballasts be installed to replace existing ballasts making them expensive and unlikely to gain significant market share. There is a need for a flexible and readily installable system that does not require replacing existing fluorescent ballasts or fixtures.

SUMMARY OF THE INVENTION

Wireless control of building facility systems via a wireless network using a wireless relay controller with a unique identifier is provided. The wireless relay controller receives wireless control signals via a wireless communication network. The wireless relay controller determines that a wireless control signal concerns the wireless relay controller based on the unique identifier. The wireless relay controller further identifies a mode of operation for a specified relay indicated by the wireless control signal and controls the power to the specified relay in accordance with the wireless control signal. The wireless control signal may also monitor the power consumption of the load controlled by the specified relay and send that information to the network.

For a further understanding of the nature and advantages of the invention, reference should be made to the following description taken in conjunction with the accompanying drawings.

DETAILED DESCRIPTION OF THE INVENTION

The embodiments of the present invention are directed to a wireless controller and a wireless network using the controller for the control of lighting systems. The radio-controlled device includes several novel features. In addition, a control system that integrates several sensors in a radio network to control lights using the radio-controlled device also includes various novel features. Each of these is described below in further detail.

Radio-Controlled Relay Device

Figure 1:
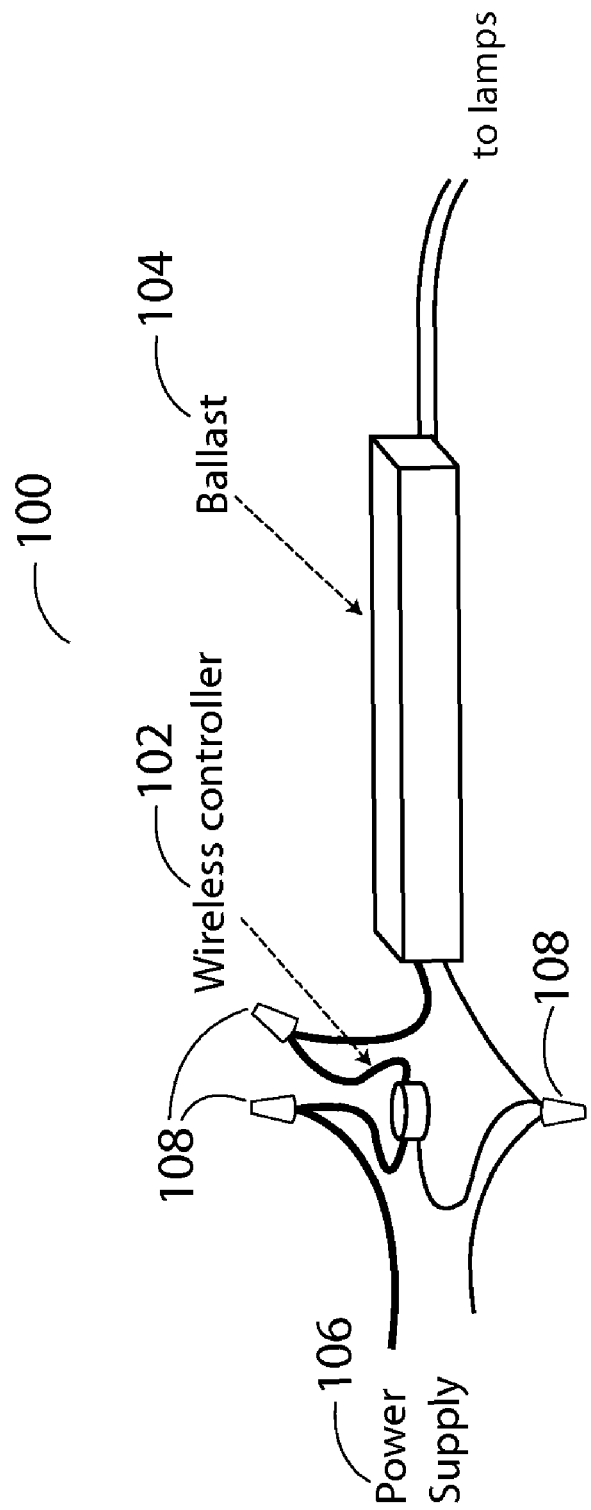
FIG. 1 is an exemplary schematic diagram of a wireless controller controlled relay installation in accordance with one embodiment of the present invention.

FIG. 1 is an exemplary schematic diagram 100 of a wireless controller controlled relay installation in accordance with one embodiment of the present invention. The radio-controlled relay device 102 can integrate a wireless radio, a relay (or one or more relays), a microprocessor, a dimming device, a power sensor and a signal generator in a stand-alone package that can easily be installed in a typical fluorescent fixture. It can be installed between ballast 104 and the ballast power source 106 and is powered by the lighting circuit. Installation is quite simple due to the design of the device. The housing of the device includes a small magnet (not shown) to enable the easy placement and positioning of the device against a lighting fixture, such as for example a fluorescent light fixture. In this manner, the device 102 is held in place with a thin magnet and the electrical connection is achieved using wire nuts 108. The packaging of the device 102 is compact and configured so that it can be installed in a few minutes to retrofit almost any fluorescent light fixture. The device 102 can be easily connected to an existing fixture with the wire nuts 108, and the device 102 can be easily integrated in a ballast using the device's compact housing its small magnet.

Figure 2:
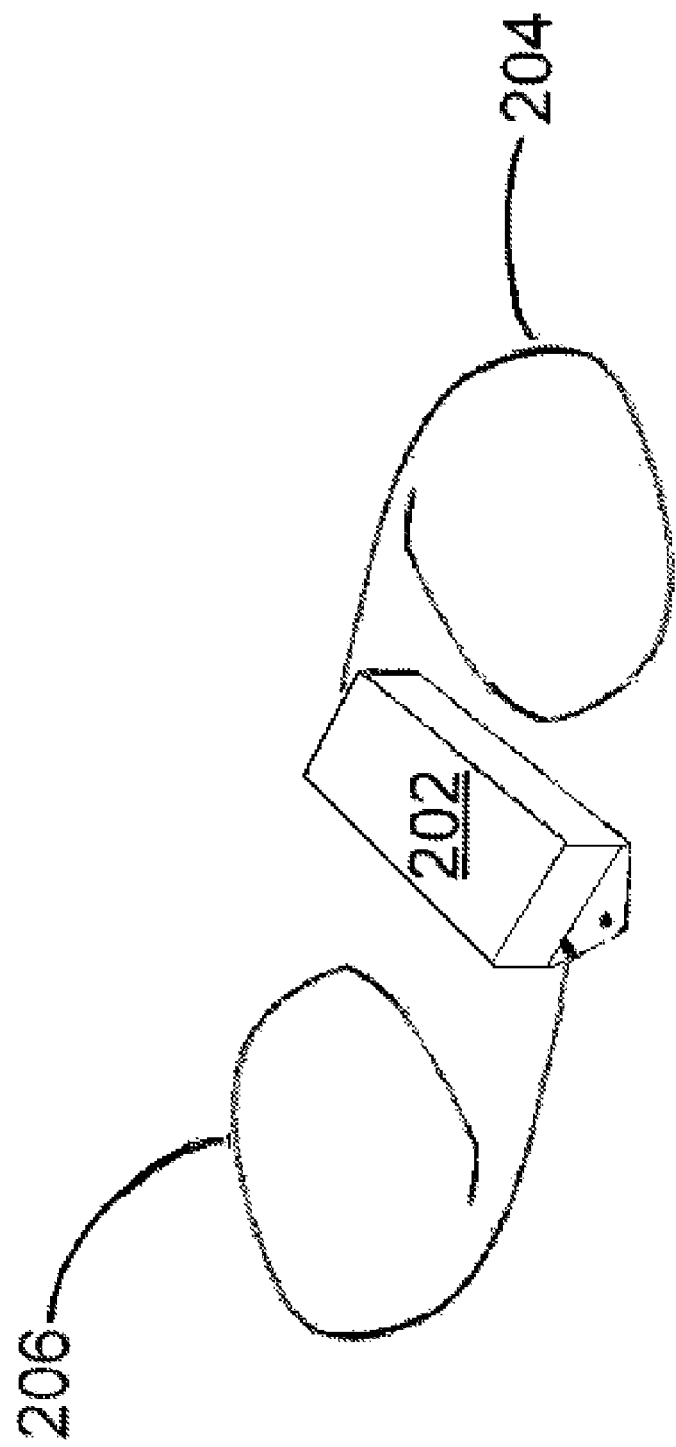
FIG. 2 shows the wireless controller of FIG. 1, its housing and wire connections.
Figure 3:
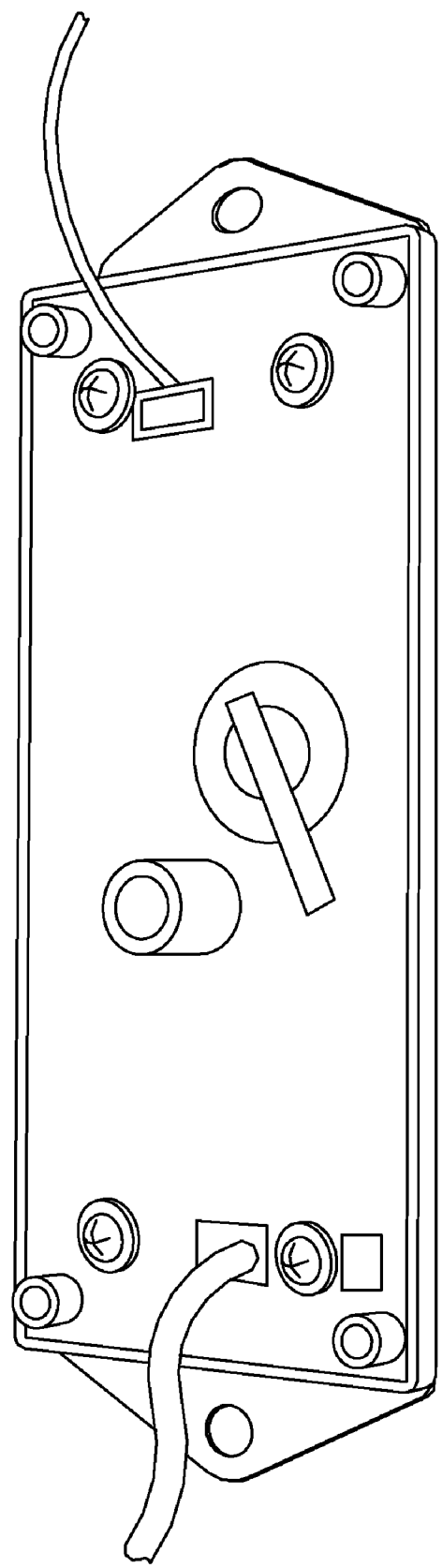
FIG. 3 shows the wireless controller of FIG. 2 with the top portion of the housing removed.

FIG. 2 shows the wireless controller of FIG. 1, its housing 202 and wire connections. Wire connections 204 are for the electrical connection of the device and wire connections 206 are for the light sensor (no shown). In this manner, once the device has been located and held in place against a light fixture, the light sensor can be optimally placed relative to the housing 202 via the flexible wire connection 206. FIG. 3 shows the wireless controller of FIG. 2 with the top portion of the housing removed, showing the printed circuit board and the internal components of the device.

Figure 4:
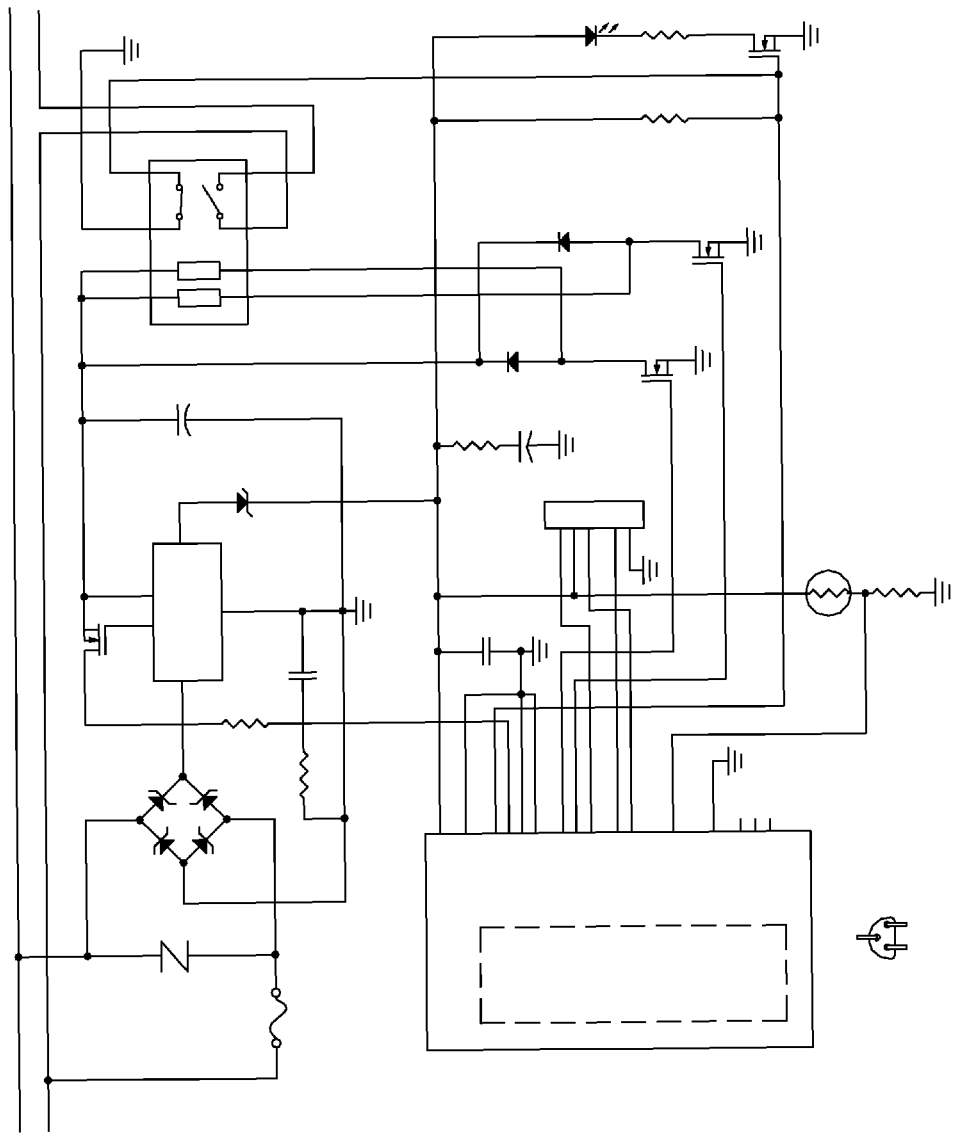
FIG. 4 is an exemplary wiring diagram for the wireless controller of FIG. 1.

FIG. 4 is an exemplary wiring diagram for the wireless controller of FIG. 1. The relay device is capable of receiving a radio signal that contains control information including turning on and off or dimming. This information can be specific to an individual relay or it can be for a group of relays. The device can also measure energy consumption of the light fixture or ballast and can transmit energy use and power quality information to a radio network. A light sensor in the device can detect whether the lamp is working properly and send information to the network about the status of the lamp. The device includes a power supply circuit that provides low-voltage operating power for the processor and the relay using the line voltage as a source. The line voltage can be either 120V or 277V, making the system compatible with most lighting systems. The design of this relay device makes it suitable for use in existing buildings, especially those with fluorescent fixtures without requiring new ballasts. The relay controller device can include the following features, which are summarized below.

Power supply: The controller is powered by using a small amount of current from the lighting circuit. It is compatible with any voltage between 24 VAC and 277 VAC.

On/off control: One function of the device is to turn one or more ballasts on or off using one or more electromechanical relays.

Light sensor: The controller can have a low-cost light sensor that can measure approximate light levels. A purpose of this sensor is to determine if the lights that the controller is switching are on or off. It can be used to identify burned-out bulbs or malfunctioning relays or ballasts.

Power measurement: The device includes a power sensor that monitors energy use of the load controlled by controller. This allows the device to provide lighting energy usage at a detailed level. It can also be used to identify power outages or circuit failures.

0-10-volt control signal: Many existing dimmable ballasts use a 0-10-volt input signal to control light output. By having the capability to provide this signal into the controller, the system is compatible with existing dimming ballasts.

Short-term backup power supply: The controller device is powered by a small power supply circuit connected to the power provided for the ballast. In the event of a power failure or circuit failure, the device has the ability to continue operating for a minimum of one hour. The backup power supply circuit includes a capacitor that is charged by the power provided for the ballast. Alternatively, the backup power supply circuit can include a battery.

Integrated dimmer: By integrating a dimming circuit into the controller, it can be used to dim incandescent bulbs or dimmable fluorescent lights.

The wireless controller is configured to store location information and other data attributes related to its unique installation. Such information can include data such as an identifier, group information, and location of the device (e.g., building name, floor, fixture, group, etc.), which can be programmed into the device at or prior to its installation.

Integrated System

Figure 5:
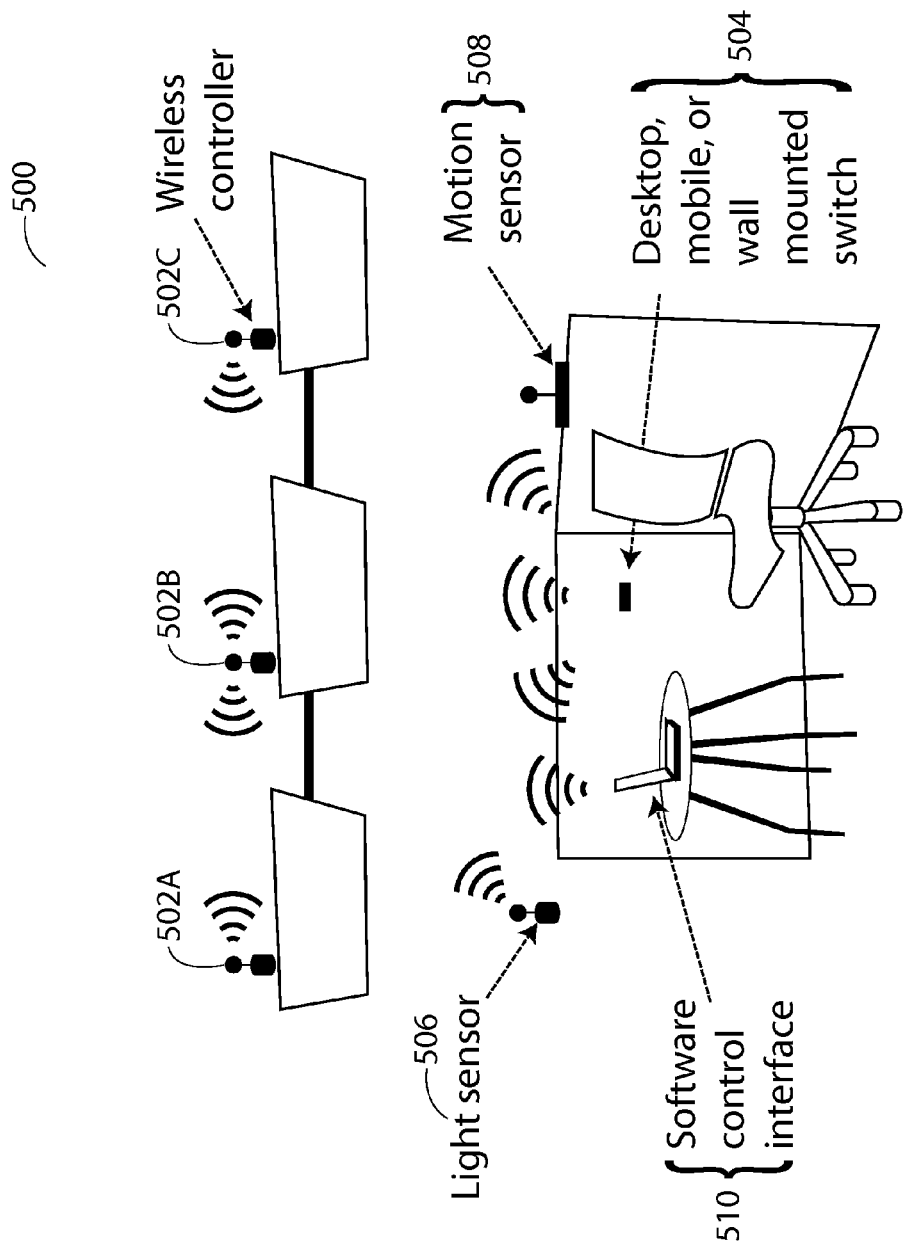
FIG. 5 is an exemplary diagram of a lighting control system using the wireless controller of FIG. 1.

FIG. 5 is an exemplary diagram of a lighting control system 500 using the wireless controller of FIG. 1. The system 500 is novel in the way it integrates sensors and controllers in a wireless network to enable multiple control strategies for lighting systems. The system 500 includes one or more radio controlled relay devices 502A-C that can control one or more ballasts each, one or more hand-held or wall mounted controllers 504 that can generate control commands and send them over the network, one or more stand-alone light level sensors 506 that can measure room light levels and send that data to the network, one or more stand-alone motion sensors 508 that can be used to detect occupancy, and a software-based controller 510 that interfaces with a LAN to allow signals generated via software to be communicated over the radio network. The various components of the network 500 are further described below.

In one embodiment, the occupancy sensor node 508 is a passive infrared sensor that can be used to detect motion as a proxy for occupancy. It transmits information about occupancy via a radio to the network whenever the occupancy state changes. That information can be used by any controller on the network. This device can be powered by either batteries or a small photovoltaic device.

Light level sensor node 506 measures the visible light level using a sensor connected to a radio and transmits the light level information to the network. This information can be used to turn lights on and off in response to daylight.

The LAN interface device 510 connects to a local area network and relays control information to the network and relays radio network information (e.g., energy use, light levels, relay state, failure information, etc.) to the local area network.

Figure 6:
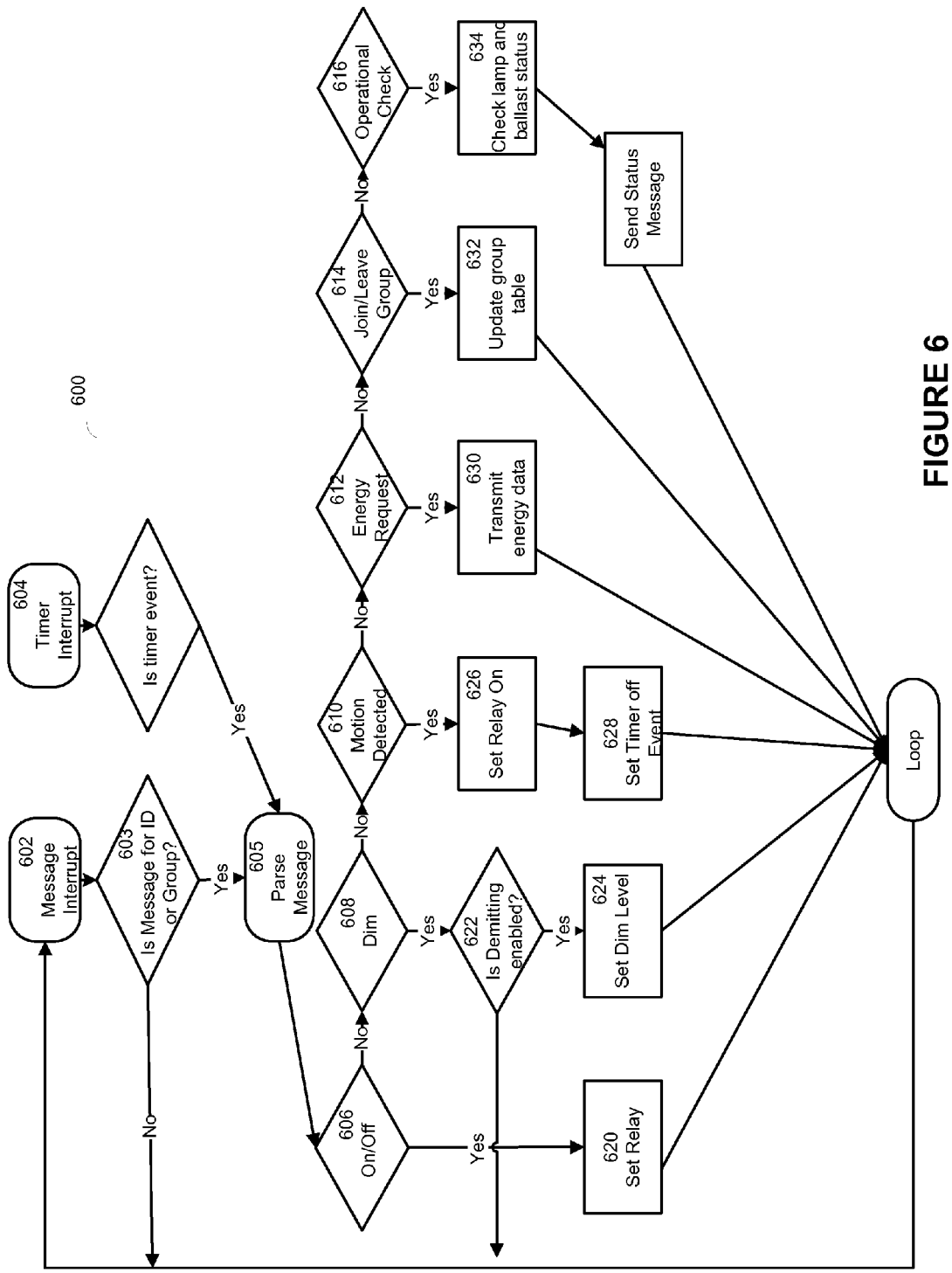
FIG. 6 is an exemplary controller software flowchart for the control system of FIG. 5.

FIG. 6 is an exemplary controller software flowchart 600 for the control system of FIG. 5. The computer program for the software-based controller 510 can be loaded from a computer-readable medium for execution by a host computer. As used herein, a variety of computer-readable media may be used for the recording media that stores the controller software, including: CD-ROM, flexible disks, magneto-optic discs, IC cards, ROM cartridges, punched cards, and internal storage devices (memories, such as RAM and ROM) and external storage devices. As can be seen the controller software operates in one of two main interrupt modes, namely a message interrupt 602 and a timer interrupt mode 604. For the message interrupt mode, once a message is received by the LAN interface device, at 603 it is determined whether the message is intended for an individual device or a group of devices that are controlled by the network. Once it has been decided that the message is intended for an individual device or a group of devices, the message is parsed at 605 to determine what message has been sent. Possible messages include: on/off; dim; motion detection; energy request; join/leave group and operational check.

If at 606, a determination is made that the message is an on or off message, the on or off message is sent out over the wireless network to a wireless controller where the relay is set (620). Once the relay has been set, the loop is closed and the software awaits another message or timer interrupt.

If at 606, it is determined that the message is not an on/off message, at 608, it is determined whether the message is a dimming message. If so, a check is made at 622, to determine whether a dimming option is enabled, and if yes, the dim level command is send to set the dim level at 624. If dimming is not enabled control returns to 602.

If at 608, it is determined that the message is not a dimming message, at 610, it is determined whether motion has been detected. If so, then at 626 the relay is set to on, and then at 628, a timer is set to turn the relay off after a certain time duration, and the control loop returns to 602.

If at 610 it is determined that motion was not detected, then at 612 it is determined whether an energy usage request has been made by the software controller. An energy request command is then sent to one or more of the wireless controllers. In response, a wireless controller sends its energy usage information back to the controller 510 at 630.

If at 612, it is determined that an energy request was not detected, then at 614, it is determined whether a request has been made to join (or otherwise leave) a wireless controller with a group. If so, at 632, appropriate group tables are updated. Such tables are stored in a database that is used by the software controller at the host computer.

If at 614 it is determined that a join/leave request was not detected, then at 616 it is determined whether an operational check message has been received. In response to an operational check message, the status of the lamp and/or ballast is checked at 634, and a message is sent by the relay controller to update the system's software-based controller with the status of a wireless relay controller. The wireless relay controller generates the requested information using its power sensor circuit, or its light sensor, or both.

So, in operation, once it has been determined what message has been received; appropriate follow-on action is taken. For example when a message has been received to turn a fixture off, an appropriate command is sent to the wireless relay controller to turn the fixture off, and so on, as shown on FIG. 6. In addition to the message interrupt mode, the network controller can also function in a timer interrupt mode, where control functions are initiated in response to timer events.

The wireless relay controller as a stand alone device and as a device incorporated in an integrated system, for example as shown in FIG. 5, provides several advantageous features. The power consumption circuit of the device enables the measuring of actual power consumption of lamps connected to the controller, and the device sends this information to the integrated system. This power consumption data, along with other events in the system, are stored in a database on the host computer connected via a LAN or the internet via a gateway element. This information has many potential uses including monitoring for energy conservation, demand response, and diagnostic purposes. In addition, the motion and light level sensors are not required to be associated with a particular light fixture, but rather can be a part of the integrated system and the light level and motion data can be used by any controller on the network.

Figure 7:
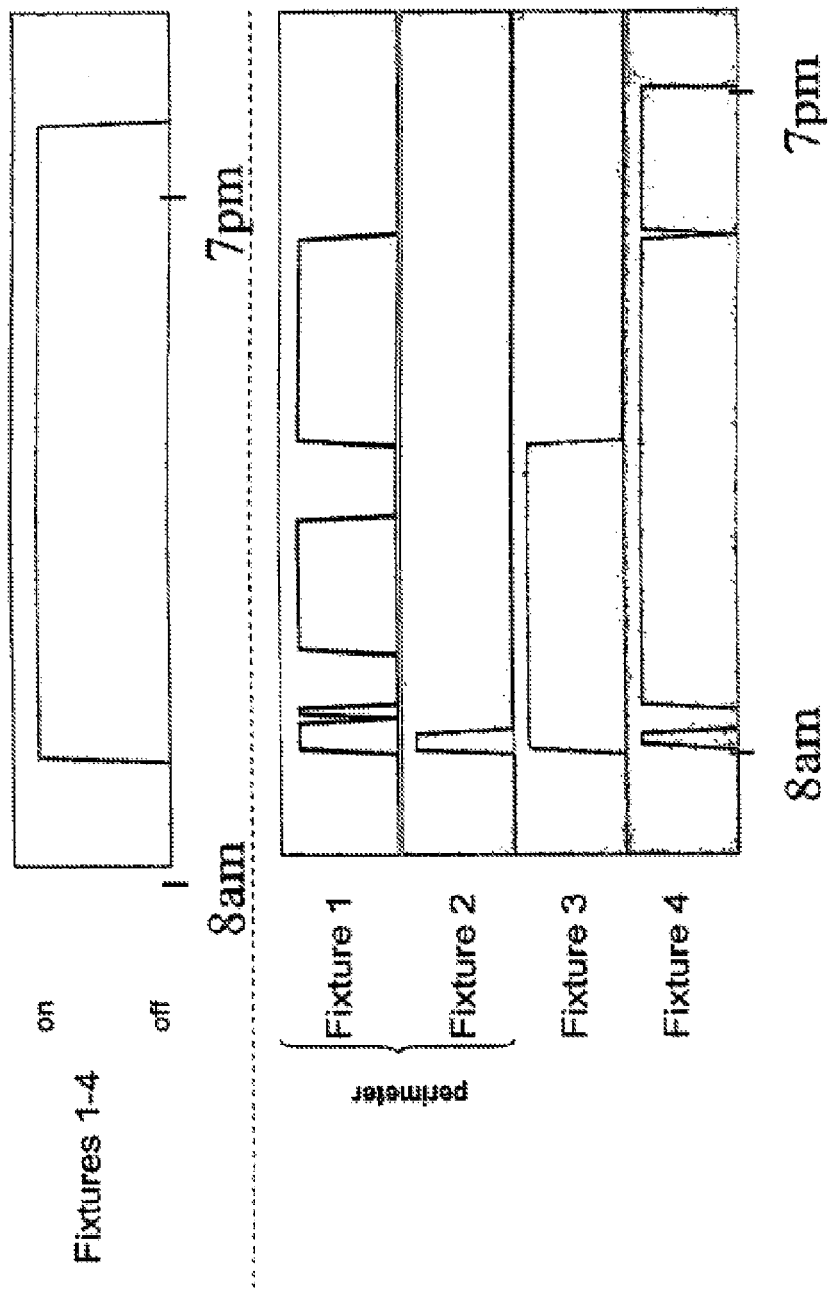
FIG. 7 shows an exemplary diagram of a typical lighting fixture use before and after retrofit with the wireless controller in accordance with the embodiments of the present invention.

FIG. 7 shows an exemplary diagram of a typical lighting fixture use before and after retrofit with the wireless controller in accordance with the embodiments of the present invention. As is shown in FIG. 7, four fixtures in a typical office room are normally on from about 8 am to 7 pm. In contrast, when the fixtures are incorporated into a network and controlled with the wireless relay device as described above, their on time is drastically reduced. For example, fixtures 3 and 4 are on when an occupant is near them and off otherwise. Fixture 2, being a perimeter fixture is on for short time and then off, since the light level sensor has send a message indicating that sufficient outdoor light is present. The overall fixture use reflects a 40 percent reduction in energy usage.

Accordingly, as will be understood by those of skill in the art, the present invention which is related to the wireless control of individual lighting fixtures via a wireless radio network after a simple retrofit at the fixture level, may be embodied in other specific forms without departing from the essential characteristics thereof. For example, any wireless protocol may be used to implement the control scheme in accordance with the embodiments of the present invention. Accordingly, the foregoing disclosure is intended to be illustrative, but not limiting, of the scope of the invention, which is set forth in the following claims.

What is claimed is:

1. A method for wirelessly controlling a building facility system, the method comprising:
    maintaining installation information in memory, the installation information including a unique identifier of a wireless relay controller in the building facility system;
    receiving a wireless control signal, the wireless control signal being sent via a wireless communication network; and
    executing instructions stored in memory, wherein execution of the instructions by a processor:
        determines that the wireless control signal concerns the wireless relay controller based on an association between the wireless control signal and the unique identifier of the wireless relay controller,
        identifies that the wireless control signal indicates a mode of operation for a specified relay associated with the wireless relay controller, the wireless relay controller being associated with one or more relays,
        controls power supplied to the specified relay, wherein the specified relay operates in accordance with the mode of operation indicated by the wireless control signal,
        measures an amount of power used by an electrical load controlled by the specified relay, wherein the power measurement is wirelessly transmitted to a designated recipient.

2. The method of claim 1, further comprising determining that the power measurement indicates a power outage or circuit failure.

3. The method of claim 2, further comprising determining power quality used by the controlled load, the power quality determination indicating that the light fixture is working improperly, and wirelessly transmitting the power quality determination to a designated recipient.

4. The method of claim 1, wherein the facility system comprises a lighting system and the specified relay is associated with a ballast and/or a lamp in the lighting system, and further comprising determining a lighting status of the lamp and wirelessly transmitting the lighting status to a designated recipient.

5. The method of claim 4, further comprising identifying a fault state based on a status of the ballast and/or the associated lamp.

6. The method of claim 1, further comprising parsing the wireless control signal to determine the mode of operation indicated, the determination of the mode of operation based on rule-based logic.

7. The method of claim 1, wherein the mode of operation indicated by the wireless control signal is associated with a demand response event for reducing building power consumption.

8. The method of claim 1, wherein the wireless control signal includes instructions regarding timing the operations of the specified relay.

9. The method of claim 1, wherein the wireless control signal further indicates a control group comprising a plurality of wireless relay controllers and further comprising identifying that the wireless relay controller is part of the control group, the identification based on associating the unique identifier of the wireless relay controller with the control group indicated by the wireless control signal.

10. A system for wirelessly controlling a building facility system, the method comprising:
    a memory configured to maintain installation information, the installation information including a unique identifier of a wireless relay controller in the building facility system;
    an interface configured to receive a wireless control signal, the wireless control signal being sent via a wireless communication network;
    a processor configured to execute instructions stored in memory, wherein execution of the instructions by the processor:
        determines that the wireless control signal concerns the wireless relay controller based on an association between the wireless control signal and the unique identifier of the wireless relay controller,
        identifies that the wireless control signal indicates a mode of operation for a specified relay associated with the wireless relay controller, the wireless relay controller being associated with a plurality of relays, and controls power supplied to the specified relay, wherein the specified relay operates in accordance with the mode of operation indicated by the wireless control signal; and a power sensor configured to measure an amount of power used by an electrical load controlled by the specified relay, wherein the power measurement is wirelessly transmitted to a designated recipient by the interface.

11. The system of claim 10, wherein the instructions are further executable by the processor to determine that the power measurement indicates a power outage or circuit failure.

12. The system of claim 10, wherein the facility system comprises a lighting system and the specified relay is associated with a ballast and/or a lamp in the lighting system, and further comprising a light sensor configured to determine a lighting status of the lamp.

13. The system of claim 10, wherein the facility system comprises a lighting system and the specified relay is associated with a ballast and/or a lamp in the lighting system, and further comprising a dimming device executable by the processor to dim light generated by the lamp.

14. The system of claim 10, further comprising a magnet configured to detachably connect to a housing associated with the wireless relay controller.

15. The system of claim 10, further comprising a timer executable by the processor to determine timing of operation of the specified relay in accordance with timing instructions indicated by the wireless control signal.

16. The system of claim 10, wherein the instructions are further executable by the processor to identify a fault state based on a status of the wireless relay ballast and or lamp.

17. The system of claim 10, wherein the wireless control signal indicates a mode of operation associated with a demand response event for reducing building power consumption.

18. The system of claim 10, wherein the wireless control signal further indicates a control group comprising a plurality of wireless relay controllers and wherein execution of the instructions further identifies that the wireless relay controller is part of the control group, the identification based on associating the unique identifier of the wireless relay controller with the control group indicated by the wireless control signal.

19. A computer-readable storage medium, having embodied thereon a program, the program being executable by a processor to perform a method for wirelessly controlling a building facility system, the method comprising:

maintaining installation information, the installation information including a unique identifier of a wireless relay controller in the building facility system;

receiving a wireless control signal, the wireless control signal being sent via a wireless communication network;

determining that the wireless control signal concerns the wireless relay controller based on an association between the wireless control signal and the unique identifier of the wireless relay controller;

identifying that the wireless control signal indicates a mode of operation for a specified relay associated with the wireless relay controller, the wireless relay controller being associated with one or more relays;

controlling power supplied to the specified relay, wherein the specified relay operates in accordance with the mode of operation indicated by the wireless control signal;

measuring an amount of power used by an electrical load controlled by the specified relay; and wirelessly transmitting the power measurement to a designated recipient.

* * * * *